(12) United States Patent
Kim et al.

(10) Patent No.: US 7,405,900 B2
(45) Date of Patent: Jul. 29, 2008

(54) MAGNETIC RECORDING AND/OR READING APPARATUS AND MANUFACTURING METHOD OF POWER TRANSMITTING GEAR

(75) Inventors: Jun-Young Kim, Suwon-si (KR); Bong-Joo Kim, Suwon-si (KR); Young-Ho Cho, Suwon-si (KR); Chung-Hum Baik, Suwon-si (KR); Myoung-Joon Kim, Suwon-si (KR); Jae-Kab Seo, Suwon-si (KR)

(73) Assignee: Samsung Electronics Co. Ltd., Yeongtong-gu, Suwon-si, Gyeonggi-do (KR)

(*) Notice: Subject to any disclaimer, the term of this patent is extended or adjusted under 35 U.S.C. 154(b) by 398 days.

(21) Appl. No.: 11/061,522

(22) Filed: Feb. 22, 2005

(65) Prior Publication Data
US 2005/0280927 A1    Dec. 22, 2005

(30) Foreign Application Priority Data
Jun. 17, 2004  (KR)  .................... 10-2004-0044873

(51) Int. Cl.
*G11B 5/027* (2006.01)
(52) U.S. Cl. ........................................ 360/85
(58) Field of Classification Search .............. 360/85
See application file for complete search history.

(56) References Cited

U.S. PATENT DOCUMENTS

| | | | |
|---|---|---|---|
| 5,014,140 A * | 5/1991 | Nishida et al. | 360/85 |
| 5,043,832 A * | 8/1991 | Ueda et al. | 360/99.07 |
| 5,486,958 A * | 1/1996 | Choi et al. | 360/85 |
| 5,712,744 A * | 1/1998 | Sakama et al. | 360/85 |
| 5,943,181 A | 8/1999 | Son et al. | |
| 6,517,440 B2 * | 2/2003 | Russell | 464/179 |
| 2002/0181146 A1 | 12/2002 | Kurumatani et al. | |

FOREIGN PATENT DOCUMENTS

KR   1020030063648   7/2003

\* cited by examiner

*Primary Examiner*—Joseph Feild
*Assistant Examiner*—Mark Blouin
(74) *Attorney, Agent, or Firm*—Roylance, Abrams, Berdo & Goodman, LLP

(57) ABSTRACT

Provided are a magnetic recording and/or reading apparatus and a method of manufacturing a power transmitting gear. The magnetic recording and/or reading apparatus includes a power transmitting gear. The power transmitting gear has one end coupled to a loading motor and the other end coupled to a plurality of link gears to transmit power from a loading motor to drive components during loading and unloading of a magnetic tape. The power transmitting gear includes a first gear engaged with a motor gear coupled to a shaft of the loading motor. The power transmitting gear also includes a second gear engaged with one of the plurality of link gears and a shaft member coupling the first and second gears. A space is formed inside the shaft member to prevent the shaft member from deforming during manufacture of the shaft member.

7 Claims, 5 Drawing Sheets

MAGNETIC RECORDING AND/OR READING APPARATUS AND MANUFACTURING METHOD OF POWER TRANSMITTING GEAR

CROSS-REFERENCE TO RELATED APPLICATIONS

This application claims the benefit under 35 U.S.C. § 119(a) of Korean Patent Application No. 2004-44873, entitled "Magnetic Recording/Reading Apparatus and Method of Power Transmitting Gear," filed on Jun. 17, 2004, the entire disclosure of which is hereby incorporated by reference.

BACKGROUND OF THE INVENTION

1. Field of the Invention

The present invention relates to a magnetic recording and/or reading apparatus. More particularly, the present invention relates to a magnetic recording and/or reading apparatus including a power transmitting gear to transmit power from a loading motor to drive components driven during loading and unloading of magnetic tape.

2. Description of the Related Art

In general, magnetic recording and/or reading apparatuses record information on and/or read information from a recording medium such as magnetic tape. Examples of the magnetic recording and/or reading apparatuses include video cassette tape recorders (VCRs), camcorders, and the like. Typical magnetic recording and/or reading apparatuses generally comprise a head drum installed on a main chassis, a loading motor, a capstan motor, and a pair of reel assemblies on which a cassette tape is placed.

The loading motor drives a main gear to power several components of the magnetic recording and/or reading apparatus coupled to the main gear to load and unload magnetic tape. For example, the main gear may drive a pole base unit, a pinch roller unit, and a brake unit.

FIG. 1 illustrates a power transmitting process of a loading motor and a main gear. Referring to FIG. 1, a loading motor 10, a power transmitting gear 20 coupled to the loading motor 10, a relay gear 32, and a main gear 34 are shown.

The power transmitting gear 20 includes a first gear 22 engaged with a motor gear 12 coupled to a shaft of the loading motor 10. Additionally, a second gear 26 engages with relay gear 32 coupled to the main gear 34, and a shaft member 24 couples the first and second gears 22, 26. The first gear 22, the second gear 26, and the shaft member 24 are formed of a general plastic material in consideration of manufacturing convenience and cost.

FIG. 2 is a cross-sectional view of the shaft member 24 of the power transmitting gear 20. As shown in FIG. 2, the shaft member 24 is bar-shaped and is preferably filled with a material such as plastic material; however, other suitable materials may be used. As described above, the power transmitting gear 20 is generally injection-molded using a plastic material in consideration of manufacturing convenience and cost. However, the shaft member 24 is susceptible to deformation due to conditions of the mold. In other words, the shaft member 24 may distort or twist due to several reasons including injection pressure, drying conditions, and the like during injection-molding. The loading motor 10 rotates at about 1,000 rpm during loading and/or unloading of the magnetic tape. Thus, directly coupling the power transmitting gear 20 to the loading motor 10 to spin is not normally desirable due to relatively serious twisting and swinging of the shaft member 24. As a result of such an arrangement, noise levels increase. In particular, abnormal noises are typically made during loading and unloading of the magnetic tape. In a case where the shaft member 24 is long, it is difficult to control swinging of the shaft member 24. As a result, levels of abnormal noise increase.

Accordingly, there is a need for an improved power transmitting gear and a method of manufacturing the power transmitting gear to reduce twisting, swinging, and noise levels during operation.

SUMMARY OF THE INVENTION

An aspect of the present invention is to solve at least the above problems and/or disadvantages and to provide at least the advantages described below. Accordingly, an aspect of the present invention is to provide a magnetic recording and/or reading apparatus including an improved power transmitting gear and a method of manufacturing the power transmitting gear.

According to an aspect of the present invention, there is provided a magnetic recording and/or reading apparatus including a power transmitting gear. The power transmitting gear has one end coupled to a loading motor and the other end coupled to a plurality of link gears to transmit power from the loading motor to drive components driven during loading and unloading of a magnetic tape. The power transmitting gear includes a first gear engaged with a motor gear coupled to a shaft of the loading motor, a second gear engaged with one of the plurality of link gears, and a shaft member is coupled to the first and second gears. A space is formed inside the shaft member to prevent the shaft member from deforming during manufacturing of the shaft member.

It is preferable that that the space in the axis hole has a predetermined radius to penetrate through the shaft member along an axial direction of the shaft member.

It is preferable that a notch is formed in an outer surface of the shaft member.

It is also preferable that the first gear, the second gear, and the shaft member are formed as a single molded part.

According to another aspect of the present invention, there is provided a method of manufacturing a power transmitting gear of a magnetic recording and/or reading apparatus. The power transmitting gear includes a first gear engaged with a motor gear coupled to a shaft of a loading motor, a second gear engaged with one of a plurality of link gears to transmit power from the loading motor to drive components driven during loading and unloading of a magnetic tape, and a shaft member coupling the first and second gears and comprising an axis hole to prevent the shaft member from deforming. The method includes the steps of installing a guide pin corresponding to a size of the axis hole of the shaft member in a molding part of a mold, injecting melted plastic into the molding part, cooling the injected plastic, and opening the mold to take the molded power transmitting gear out of the mold.

Other objects, advantages, and salient features of the invention will become apparent to those skilled in the art from the following detailed description, which, taken in conjunction with the annexed drawings, discloses preferred embodiments of the invention.

BRIEF DESCRIPTION OF THE DRAWINGS

The above and other objects, and features, and advantages of certain embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for conciseness.

Figure 1:
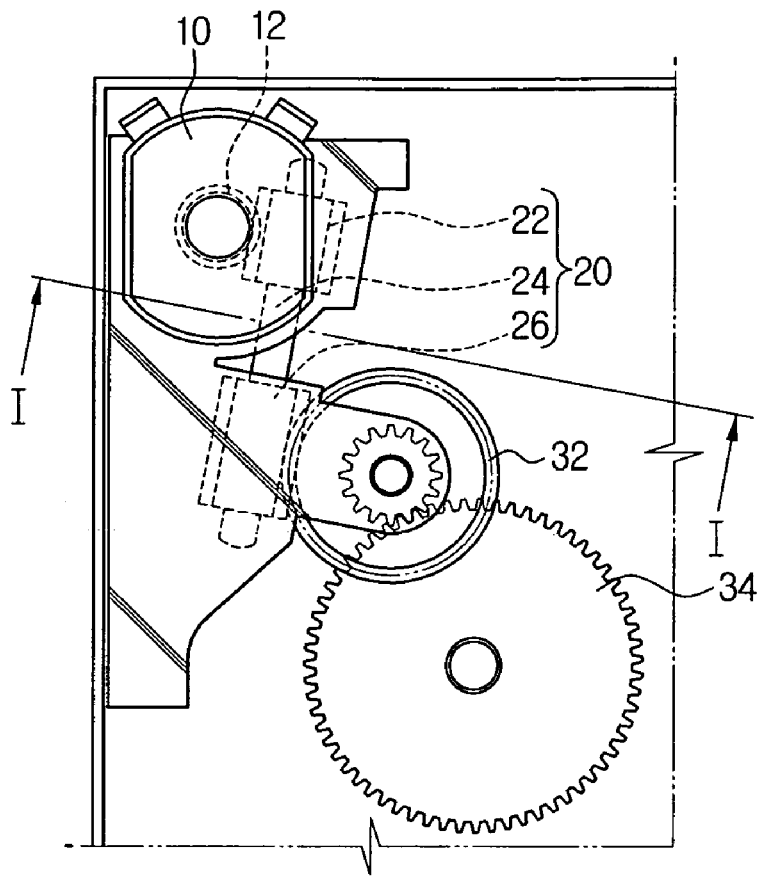
FIG. 1 illustrates a power transmitting process of a conventional loading motor.
Figure 2:
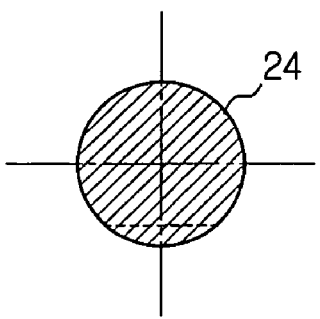
FIG. 2 is a cross-sectional view of a shaft member shown in FIG. 1, taken along line I-I.
Figure 3:
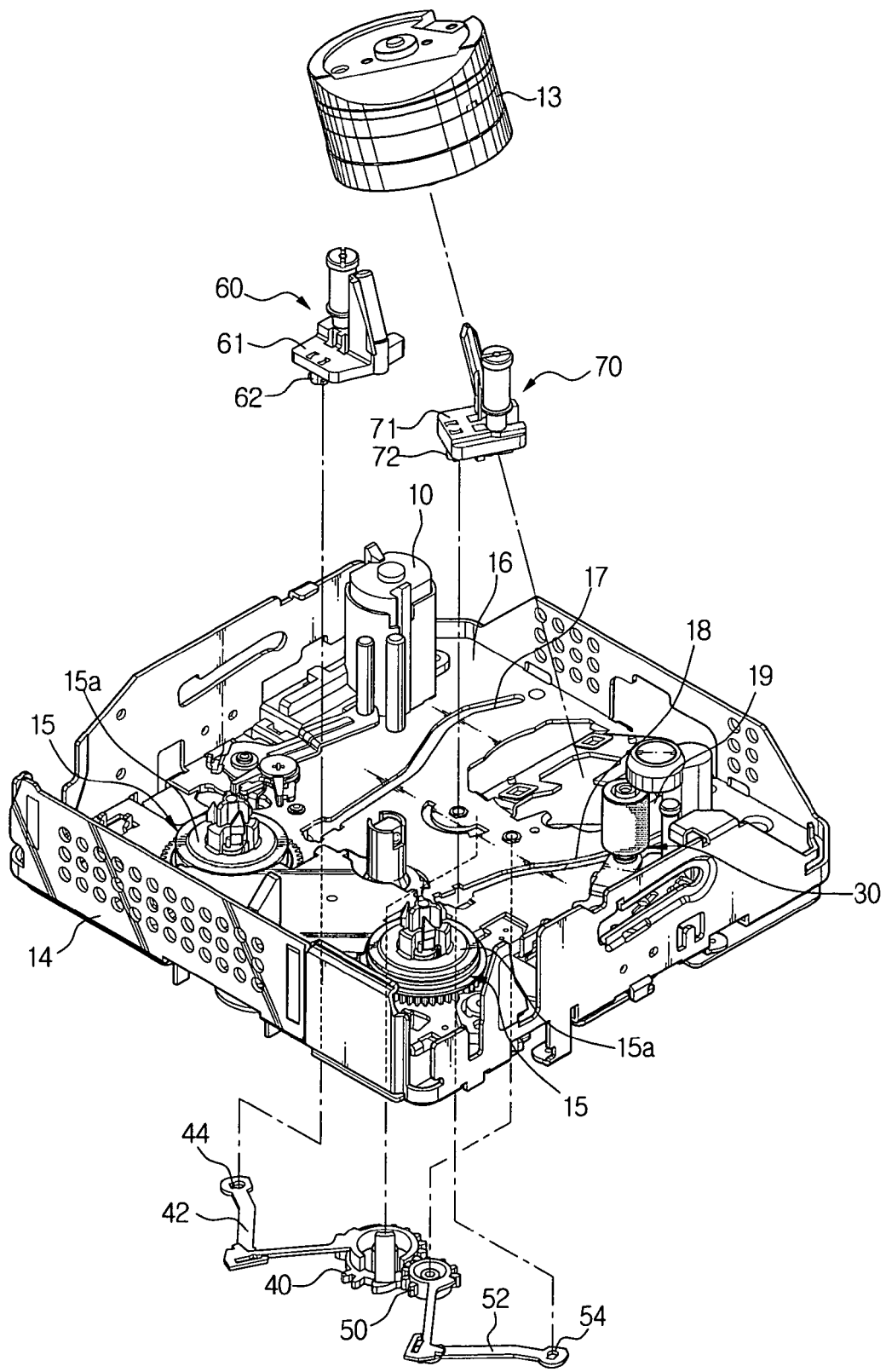
FIG. 3 is a schematic exploded perspective view of a magnetic recording and/or reading apparatus, in accordance with an embodiment of the present invention.
Figure 4:
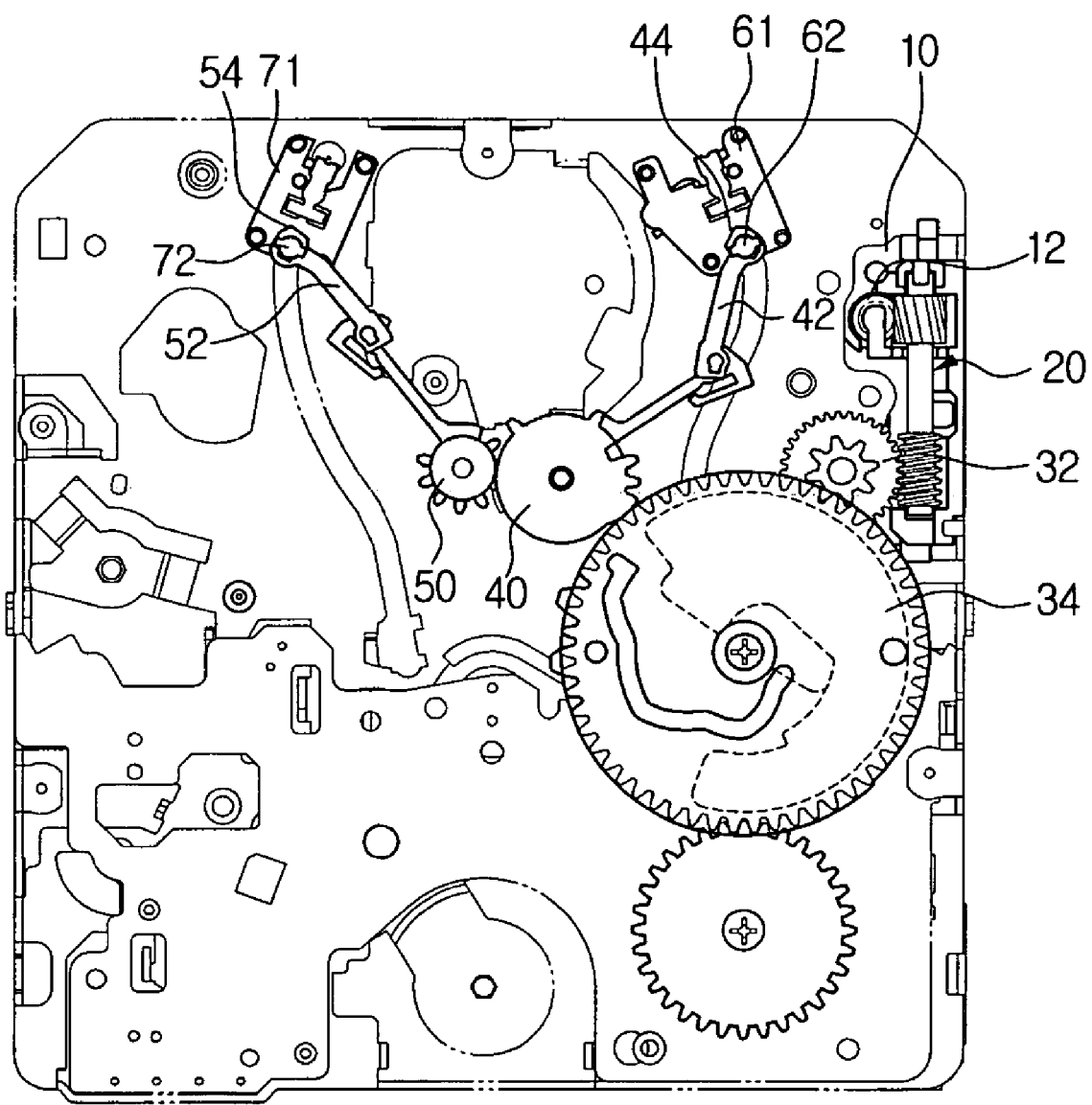
FIG. 4 is a plan view of main components illustrating a power transmitting process of a loading motor, according to an embodiment of the present invention.

FIG. 3 is a schematic exploded perspective view of a magnetic recording and/or reading apparatus according to an embodiment of the present invention. FIG. 4 is a plan view of the main components of FIG. 3 illustrating a process of operating pole base units 60, 70 by driving a main gear 34 coupled to a loading motor 10. As shown in FIG. 3, the magnetic recording and/or reading apparatus includes a head drum 13 installed on a main chassis 16, the loading motor 10, a capstan motor 19, a pair of reel assemblies 15 on which a cassette tape is placed, a pair of pole base units 60, 70, a pair of loading gears 40, 50 respectively coupled to the pair of pole base units 60, 70, and a cassette holder 14. The loading motor 10 drives the main gear 34 as shown in FIG. 4 to power several components of the magnetic recoding and/or reading apparatus operating during loading and unloading. For example, the pole base units 60, 70 withdraw a magnetic tape from a cassette tape (not shown) and travel along a pair of guide rails 17, 18 formed on the main chassis 16. Thus, the magnetic tape contacts the head drum 13. A pinch roller unit 30 presses the magnetic tape on a shaft of the capstan motor 19 during loading of the magnetic tape. A brake unit (not shown) selectively brakes rotation of reel discs 15a of the reel assemblies 15 and the like.

A power transmitting gear 20 is coupled to a motor gear 12 installed on the loading motor 10. A relay gear 32 is coupled to the power transmitting gear 20 and the main gear 34 is coupled to the relay gear 32. The pair of loading gears 40, 50 are coupled to the pair of pole base units 60, 70, which in turn are coupled to the main gear 34. Link members 42, 52 are coupled to the pair of pole base units 60, 70. As stated above, the pole base units 60, 70 are moveably coupled to ends of the loading gears 40, 50. Protruding pins 62, 72 are arranged on base members 61, 71 of the pair of pole base units 60, 70 and coupled to slots 44, 54 formed on ends of the link members 42, 52. Thus, when the loading motor 10 is driven, rotation power of the loading motor 10 is transmitted to the loading gears 40, 50 to drive the pole base units 60, 70 via the power transmitting gear 20, the relay gear 32, and the main gear 34.

In other words, when the loading motor 10 is driven, the rotation power of the loading motor 10 is transmitted to several components of the magnetic recording and/or reading apparatus, including the pole base units 60, 70 via the power transmitting gear 20, the main gear 34, and a plurality of gears.

Figure 5:
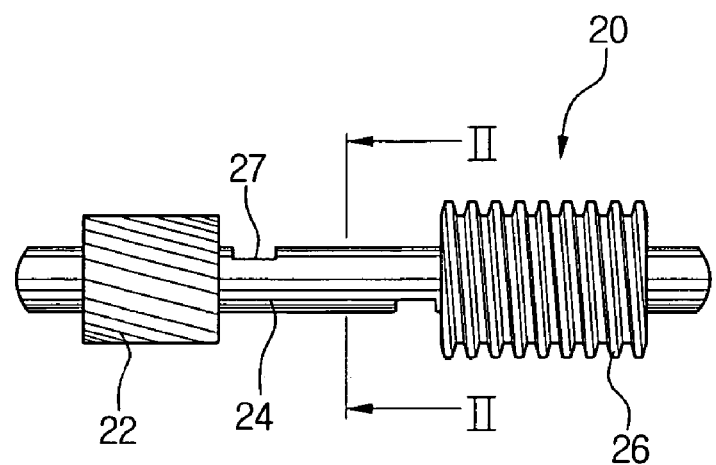
FIG. 5 is a front view of a power transmitting gear shown in FIG. 4.
Figure 6:
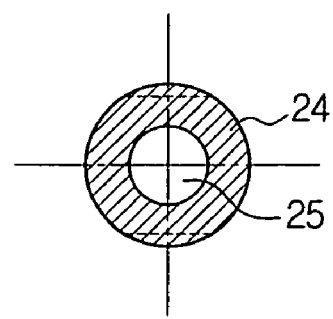
FIG. 6 is a cross-sectional view of a shaft member shown in FIG. 5, taken along line II-II.

FIG. 5 is a front view of the power transmitting gear 20 shown in FIG. 4. FIG. 6 is a cross sectional view of a shaft member shown in FIG. 5, taken along line II-II. As shown in FIG. 5, the power transmitting gear 20 includes a first gear 22, a second gear 26, and a shaft member 24.

The first gear 22 meshes with the motor gear 12 installed on a shaft of the loading motor 10 as shown in FIG. 4. The motor gear 12 includes gear trains formed from the top to the bottom along the shaft of the loading motor 10. Since an axis of the motor gear 12 is arranged preferably substantially orthogonal to an axis of the first gear 22, the first gear 22 is preferably a worm gear.

The second gear 26 meshes with the relay gear 32 to couple with the main gear 34 as shown in FIG. 4. Since an axis of the second gear 26 is preferably orthogonal to an axis of the relay gear 32, the second gear 26 is also preferably a worm gear like the first gear 22. Gear teeth of the first gear 22 and gear trains of the second gear 26 are substantially vertical.

The shaft member 24 couples the first and second gears 22, 26 and serves as a rotation axis of the first and second gears 22, 26. The shaft member 24 includes a space formed to prevent its deformation during manufacture. The space is preferably an axis hole 25 of a predetermined radius formed to penetrate through the shaft member 24 along an axis direction of the shaft member 24. The axis hole 25 may be formed during injection-molding of the power transmitting gear 20. The first gear 22, the second gear 26, and the shaft member 24 may be separately manufactured and assembled, but are preferably formed of a plastic material as a single molded part for cost savings purposes, manufacturing convenience, and assembling convenience.

Figure 7:
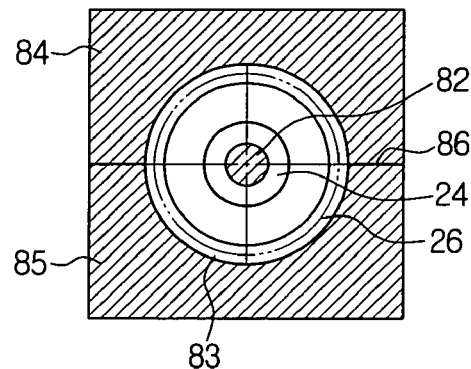
FIG. 7 is a cross-sectional view of a mold to manufacture the power transmitting gear shown in FIG. 4.
Figure 8:
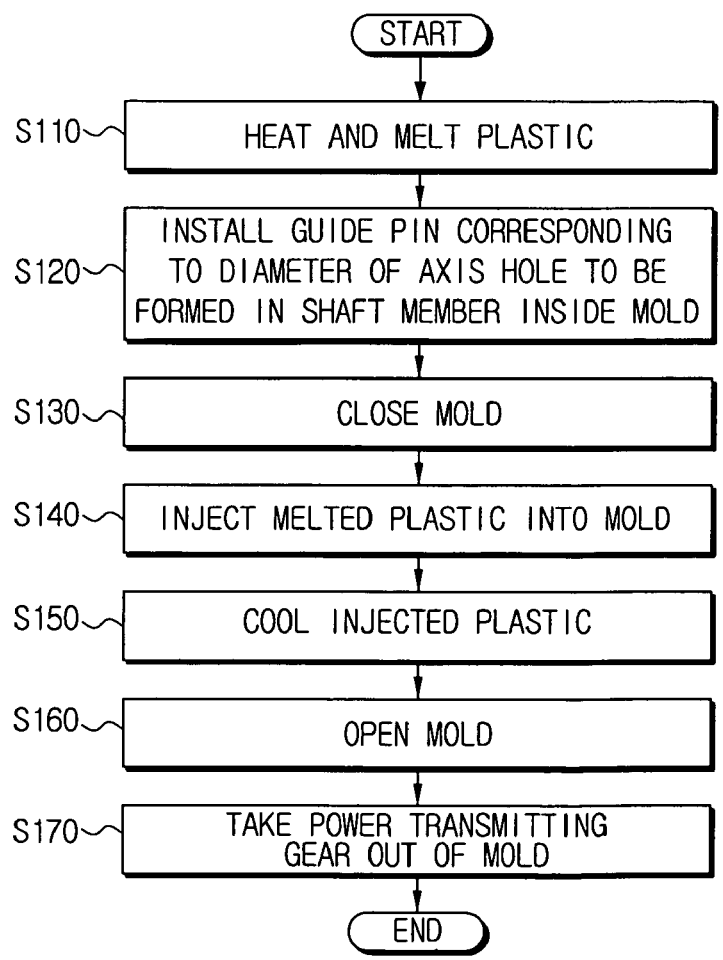
FIG. 8 is a flowchart of a method of manufacturing a power transmitting gear, in accordance with an embodiment of the present invention.

A method of manufacturing the power transmitting gear 20 including the first gear 22, the second gear 26, and the shaft member 24 that are formed as the single molded part will now be described. Particularly, a method of forming the axis hole 25 in the shaft member 24 will now be described with reference to FIGS. 6-8. FIG. 7 is a cross-sectional view of a mold for molding the power transmitting gear 20 shown in FIG. 5. The mold includes a stationary mold 85, a moveable mold 84, and a molding part 83 formed by the stationary and moveable molds 85, 84 to have the same shape as the power transmitting gear 20 shown in FIG. 5.

In step S110, a pigment, a stabilizer, a plasticizer, filler, and the like are added to plastic, and then the plastic is appropriately heated depending on its melting characteristics. The melted plastic is injected through an inlet into the molding part 83 using an injector cylinder (not shown) or a piston (not shown). However, before the melted plastic is injected into the molding part 83, in step S120, a guide pin 82 with a size corresponding to a diameter of the axis hole 25 is formed in the shaft member 24. The guide pin 82 is installed inside the molding part 83 in advance. Here, an axis of the guide pin 82 is adjusted so as to coincide with axes of the second gear 26 and the shaft member 24. In step S130, the mold is closed after the guide pin 82 is installed inside the molding part 83.

In step S140, the melted plastic is injected into the molding part 83. In step S150, the injected plastic is cooled for a predetermined period of time. In step S160, the moveable mold 84 is separated from the stationary mold 85 to open the mold, centering around a mold opening surface 86. In step S170, as shown in FIG. 5, the power transmitting gear 20 is taken out of the mold as a molded part. When the power transmitting gear 20 is manufactured using injection-molding, the axis hole 25 of the shaft member 24 is formed in a position of the guide pin 82.

Accordingly, the axis hole 25 contributes to preventing the shaft member 24 from deforming depending on injection conditions, such as twisting or swinging. Thus, the power transmitting gear 20 may stably transmit rotation power of the loading motor 10 to a plurality of power transmitting gears including the main gear 34 as shown in FIG. 4. Therefore, abnormal noise made during spinning of a loading motor driven during loading and unloading of a magnetic tape may be considerably reduced.

Also, as shown in FIG. 5, one or more notches 27 are preferably formed in an outer surface of the shaft member 24 for the manufacturing convenience of the shaft member 24.

A power transmitting process of the loading motor 10 having the above-described structure will now be explained.

When the loading motor 10 is driven, the motor gear 12 installed on the shaft of the loading motor 10 rotates. The shaft member 24 rotates with the rotation of the first gear 22 of the power transmitting gear 20. The power transmitting gear 20 is engaged with the motor gear 12, and thus the second gear 26 coupled to the shaft member 24 also rotates. The relay gear 32 engages with the second gear 26 to rotate with the rotation of the second gear 26. Thus, the main gear 34 engaged with the relay gear 32 also rotates. Several components of the magnetic recording and/or reading apparatus coupled to the main gear 32 operate with the rotation of the main gear 34.

In the present embodiment, one relay gear 32 couples the power transmitting gear 20 to the main gear 34. However, alternative suitable arrangements and constructions may be used. In other words, two or three link gears may be installed between the power transmitting gear 20 and the main gear 34. This may be modified depending on the design of the magnetic recording and/or reading apparatus.

As described above, in a magnetic recording and/or reading apparatus and a method of manufacturing a power transmitting gear according to embodiments of the present invention, an axis hole may be formed in a shaft member of the power transmitting gear. The power transmitting gears transmit power from a loading motor during loading and unloading of a magnetic tape. Thus, a noise made during spinning of the loading motor may be reduced. In particular, an abnormal noise may be considerably reduced.

While the invention has been shown and described with reference to certain embodiments thereof, it will be understood by those skilled in the art that various changes in form and details may be made therein without departing from the spirit and scope of the invention as defined by the appended claims.

What is claimed is:

1. A magnetic recording and/or reading apparatus comprising a power transmitting gear comprising one end coupled to a loading motor and the other end coupled to a plurality of link gears transmitting power of the loading motor to drive components driven during loading and unloading of a magnetic tape, wherein the power transmitting gear comprises:
    a first gear engaged with a motor gear coupled to a shaft of the loading motor;
    a second gear engaged with one of the plurality of link gears;
    a shaft member coupling the first and second gears, wherein a space being formed inside the shaft member to prevent the shaft member from deforming during manufacturing of the shaft member and the shaft member extending beyond the first and second gears, the space being an axis hole having a predetermined radius to penetrate through the shaft member along an axial direction of the shaft member; and
    a notch formed in an outer surface of the shaft member.

2. The magnetic recording and/or reading apparatus of claim 1, wherein
    the first gear, the second gear, and the shaft member are formed as a single molded part.

3. A magnetic recording and/or reading apparatus comprising a power transmitting gear comprising one end coupled to a loading motor and the other end coupled to a plurality of link gears transmitting power of the loading motor to drive components driven during loading and unloading of a magnetic tape, wherein the power transmitting gear comprises:
    a first gear engaged with a motor gear coupled to a shaft of the loading motor;
    a second gear engaged with one of the plurality of link gears; and
    a shaft member having a notch located on an outer surface, the shaft member coupling and extending beyond the first and second gears,
    wherein a space being formed inside the shaft member to prevent the shaft member from deforming during manufacturing of the shaft member.

4. The magnetic recording and/or reading apparatus of claim 3, wherein
    the space is an axis hole having a predetermined radius to penetrate through the shaft member along an axial direction of the shaft member.

5. The magnetic recording and/or reading apparatus of claim 4, wherein the first gear, the second gear, and the shaft member are integrally connected.

6. The magnetic recording and/or reading apparatus of claim 4, wherein the first gear, the second gear, and the shaft member are formed as a single molded part.

7. A method of manufacturing a power transmitting gear of a magnetic recording and/or reading apparatus comprising a first gear engaged with a motor gear coupled to a shaft of a loading motor, a second gear engaged with one of a plurality of link gears transmitting power from the loading motor to drive components during loading and unloading of a magnetic tape, and a shaft member coupling and extending beyond the first and second gears and having an axis hole to prevent the shaft member from deforming, the method comprising:
    installing a guide pin corresponding to a size of the axis hole of the shaft member in a molding part of a mold;
    injecting melted plastic into the molding part;
    cooling the injected plastic; and
    opening the mold to take the molded power transmitting gear out of the mold.

* * * * *